US011293292B2

(12) United States Patent
Smoke et al.

(10) Patent No.: US 11,293,292 B2
(45) Date of Patent: Apr. 5, 2022

(54) TURBINE SCROLL ASSEMBLY FOR GAS TURBINE ENGINE

(71) Applicant: HONEYWELL INTERNATIONAL INC., Morris Plains, NJ (US)

(72) Inventors: Jason Smoke, Phoenix, AZ (US); David K. Jan, Fountain Hills, AZ (US); Mark Matwey, Phoenix, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 37 days.

(21) Appl. No.: 16/736,199

(22) Filed: Jan. 7, 2020

(65) Prior Publication Data

US 2020/0182471 A1  Jun. 11, 2020

Related U.S. Application Data

(63) Continuation of application No. 15/403,286, filed on Jan. 11, 2017, now Pat. No. 10,655,859.

(51) Int. Cl.
*F01D 9/02*   (2006.01)
*F23R 3/52*   (2006.01)
(Continued)

(52) U.S. Cl.
CPC ............. *F01D 9/026* (2013.01); *F01D 9/023* (2013.01); *F23R 3/52* (2013.01); *F01D 11/08* (2013.01);
(Continued)

(58) Field of Classification Search
CPC .... F23R 3/52; F23R 3/425; F23R 3/26; F01D 9/026; F01D 25/14–145; F01D 9/023;
(Continued)

(56) References Cited

U.S. PATENT DOCUMENTS 2,801,519 A   8/1957 Wood
2,919,103 A   12/1959 Schelp
(Continued)

FOREIGN PATENT DOCUMENTS

DE        10061846 A1   6/2002
EP         2080870 A2   7/2009
JP       2015048810 A   3/2015

*Primary Examiner* — Gerald L Sung
*Assistant Examiner* — Rene D Ford
(74) *Attorney, Agent, or Firm* — Lorenz & Kopf, LLP

(57) ABSTRACT

A gas turbine engine includes a compressor section and a combustion section with a scroll, a scroll baffle, a combustor, and a combustor case. The scroll defines an interior scroll flow path. The scroll baffle surrounds the scroll to define a scroll cooling passage. The combustor case surrounds the combustor and the scroll baffle to define a collector space. Moreover, the engine includes a turbine section with a turbine rotor and a turbine rotor blade shroud that includes a shroud cooling passage. The compressor flow path is fluidly connected to the scroll for cooling the scroll. Also, the scroll cooling passage is fluidly connected to the shroud cooling passage for cooling the turbine rotor blade shroud. Furthermore, the shroud cooling passage is fluidly connected to the collector space. Flow from the collector space flows into the combustor, along the interior scroll flow path, toward the turbine rotor.

15 Claims, 7 Drawing Sheets

(51) Int. Cl.
*F23R 3/42* (2006.01)
*F01D 11/08* (2006.01)
*F01D 25/12* (2006.01)
*F02C 3/04* (2006.01)
*F23R 3/26* (2006.01)
*F02C 7/18* (2006.01)

(52) U.S. Cl.
CPC ............... *F01D 25/12* (2013.01); *F02C 3/04* (2013.01); *F02C 7/18* (2013.01); *F05D 2220/32* (2013.01); *F05D 2220/50* (2013.01); *F05D 2240/35* (2013.01); *F05D 2260/205* (2013.01); *F05D 2260/22141* (2013.01); *F23R 3/26* (2013.01); *F23R 3/425* (2013.01); *Y02T 50/60* (2013.01)

(58) Field of Classification Search
CPC .. F01D 11/08; F01D 25/12; F02C 3/05; F02C 3/062; F02C 7/08–105; F02C 3/04; F02C 7/18; Y02T 50/60; F05D 2220/50; F05D 2260/205; F05D 2220/32; F05D 2240/35; F05D 2260/22141
See application file for complete search history.

(56) References Cited

U.S. PATENT DOCUMENTS

| | | | |
|---|---|---|---|
| 3,228,190 A * | 1/1966 | Brown | F02C 7/08 60/39.511 |
| 3,285,006 A | 11/1966 | Freeman et al. | |
| 3,603,082 A | 9/1971 | Sneeden | |
| 3,849,022 A * | 11/1974 | Amann | F01D 9/02 415/116 |
| 4,040,249 A | 8/1977 | Kahle et al. | |
| 4,129,985 A | 12/1978 | Kajita et al. | |
| 4,177,638 A | 12/1979 | Wood | |
| 4,339,925 A | 7/1982 | Eggmann et al. | |
| 4,429,527 A | 2/1984 | Teets | |
| 4,474,000 A | 10/1984 | Benson et al. | |
| 4,506,502 A | 3/1985 | Shapiro | |
| 4,573,315 A | 3/1986 | Stroem | |
| 4,955,192 A | 9/1990 | Shekleton | |
| 5,274,997 A | 1/1994 | Inoue et al. | |
| 5,317,865 A | 6/1994 | Inoue et al. | |
| 6,101,806 A | 8/2000 | Chen et al. | |
| 6,192,669 B1 | 2/2001 | Keller et al. | |
| 6,305,172 B1 | 10/2001 | Kim | |
| 6,510,684 B2 | 1/2003 | Matsunaga | |
| 6,536,201 B2 | 3/2003 | Stuttaford et al. | |
| 7,007,475 B2 | 3/2006 | Nguyen et al. | |
| 7,251,942 B2 | 8/2007 | Dittmar et al. | |
| 7,984,615 B2 | 7/2011 | Woodcock et al. | |
| 8,127,552 B2 | 3/2012 | Schumacher et al. | |
| 8,646,277 B2 | 2/2014 | Chila et al. | |
| 8,955,332 B2 | 2/2015 | Saitou et al. | |
| 2004/0200069 A1 | 10/2004 | Nguyen et al. | |
| 2005/0097896 A1 | 5/2005 | Critchley et al. | |
| 2014/0290252 A1 | 10/2014 | Uemura et al. | |
| 2016/0003139 A1 | 1/2016 | Maeda | |

* cited by examiner

TURBINE SCROLL ASSEMBLY FOR GAS TURBINE ENGINE

CROSS REFERENCE TO RELATED APPLICATION

This application is a continuation of U.S. application Ser. No. 15/403,286, filed Jan. 11, 2017, the entire disclosure of which is incorporated herein by reference.

TECHNICAL FIELD

The present disclosure generally relates to a gas turbine engine and, more particularly, to a turbine scroll assembly for a gas turbine engine.

BACKGROUND

Gas turbine engines are generally used in a wide range of applications, such as aircraft engines and auxiliary power units. In a gas turbine engine, air is compressed in a compressor, mixed with fuel, and ignited in a combustor to generate hot combustion gases, which flow downstream into a turbine section.

During operation of the engine, temperatures within and surrounding the combustion section can be very high. Thus, it is desirable to regulate the operating temperature of certain engine components, particularly those within the mainstream hot gas flow path. Some engines include certain structures and features that provide cooling to these components. However, many of these reduce the efficiency of the engine. Also, some cooling features may not be useful in certain operating conditions. Additionally, structures with these types of cooling features may be especially difficult to manufacture.

Accordingly, it is desirable to provide a gas turbine engine with improved cooling features within and/or surrounding the combustion section. Furthermore, other desirable features and characteristics of the present disclosure will become apparent from the subsequent detailed description of the invention and the appended claims, taken in conjunction with the accompanying drawings and this background of the invention.

BRIEF SUMMARY

In one embodiment, a gas turbine engine is disclosed that includes a compressor section that defines a compressor flow path. The gas turbine engine also includes a combustion section that includes a scroll, a scroll baffle, a combustor, and a combustor case. The scroll defines an interior scroll flow path. The scroll baffle surrounds at least part of the scroll to define a scroll cooling passage between the scroll baffle and the scroll. The combustor case surrounds the combustor and at least part of the scroll baffle to define a collector space between the combustor case and the scroll baffle. Moreover, the gas turbine engine includes a turbine section with a turbine rotor and a turbine rotor blade shroud. The turbine rotor blade shroud includes a shroud cooling passage. The compressor section is coupled to the combustion section with the compressor flow path fluidly connected to the scroll cooling passage to direct flow from the compressor flow path along the scroll cooling passage to cool the scroll. Also, the combustion section is coupled to the turbine section with the scroll cooling passage fluidly connected to the shroud cooling passage to direct flow from the scroll cooling passage along the shroud cooling passage to cool the turbine rotor blade shroud. Furthermore, the shroud cooling passage is fluidly connected to the collector space. The collector space is fluidly connected to the interior scroll flow path such that flow from the collector space flows into the combustor, along the interior scroll flow path, and toward the turbine rotor.

In another embodiment, a component for a gas turbine engine is disclosed that includes a scroll with a scroll peripheral wall having an inner surface and an outer surface. The inner surface defines an interior scroll flow path that extends generally in a circumferential direction about a longitudinal axis. Also, a scroll baffle surrounds at least part of the scroll. The scroll baffle includes a baffle peripheral wall having an inner surface and an outer surface. The inner surface of the baffle peripheral wall faces the outer surface of the scroll peripheral wall. Moreover, a scroll cooling passage is defined between the outer surface of the scroll peripheral wall and the inner surface of the baffle peripheral wall. The scroll cooling passage includes an inlet and an outlet. The scroll cooling passage is configured to direct a flow from the inlet to the outlet to cool the scroll. The scroll peripheral wall is continuous along the scroll cooling passage between the inlet and the outlet. The scroll peripheral wall blocks the flow from entering the interior scroll flow path.

BRIEF DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the present disclosure or the application and uses of the present disclosure. Furthermore, there is no intention to be bound by any theory presented in the preceding background or the following detailed description.

Broadly, exemplary embodiments disclosed herein include gas turbine engines having improved cooling characteristics. Methods of manufacturing the gas turbine engines are also disclosed. In particular, exemplary embodiments include a combustion section with a turbine scroll assembly that includes a scroll cooling passage. The scroll cooling passage provides improved cooling of the turbine scroll. Other cooling features are also disclosed for cooling other components of the gas turbine engine. Additional details of the present disclosure will be discussed below.

Figure 1:
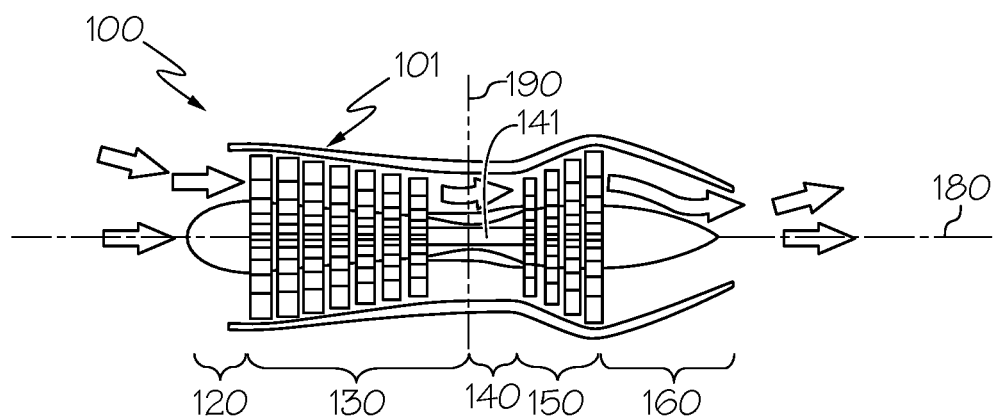
FIG. 1 is a schematic cross sectional view of a gas turbine engine according to example embodiments of the present application.

FIG. 1 is a cross-sectional view of a gas turbine engine 100 according to an exemplary embodiment. Although FIG. 1 depicts a turbojet engine, in general, exemplary embodiments discussed herein may be applicable to another type of engine without departing from the scope of the present disclosure. The gas turbine engine 100 may form part of, for example, an auxiliary power unit (APU) for an aircraft or a propulsion system for an aircraft. However, the gas turbine engine 100 may be included on another vehicle without departing from the scope of the present disclosure. Instead of being included on a vehicle, the gas turbine engine 100 may also be supported by a stationary mount in some embodiments.

The gas turbine engine 100 has an overall construction and operation that is generally understood by persons skilled in the art. The gas turbine engine 100 may be disposed in an engine case 101 and may include an intake section 120, a compressor section 130, a combustion section 140, a turbine section 150, and an exhaust section 160. A longitudinal axis 180 and a radial axis 190 are also included for reference purposes. The radial axis 190 is perpendicular to the longitudinal axis 180. It will be appreciated that a rearward longitudinal direction is defined generally from the intake section 120 toward the exhaust section 160 along the longitudinal axis 180. Conversely, a forward longitudinal direction is defined generally from the exhaust section 160 toward the intake section 120 along the longitudinal axis 180. An outboard radial direction is defined generally along the radial axis 190, away from the longitudinal axis 180. Conversely, an inboard radial direction is defined generally along the radial axis 190, toward the longitudinal axis 180. Moreover, a circumferential direction is defined generally extending around the longitudinal axis 180.

The intake section 120 may draw in and accelerate air toward the compressor section 130. The compressor section 130 may include a series of compressors that raise the pressure of the air directed into it from the intake section 120. The compressors may direct the compressed air into the combustion section 140. In the combustion section 140, the high-pressure air is mixed with fuel and combusted. The combusted air is then directed into the turbine section 150. The combusted air from the combustion section 140 causes one or more rotor assemblies to rotate a main engine shaft 141 for energy extraction. The air is then exhausted through a propulsion nozzle disposed in the exhaust section 160 to provide additional forward thrust.

Figure 2:
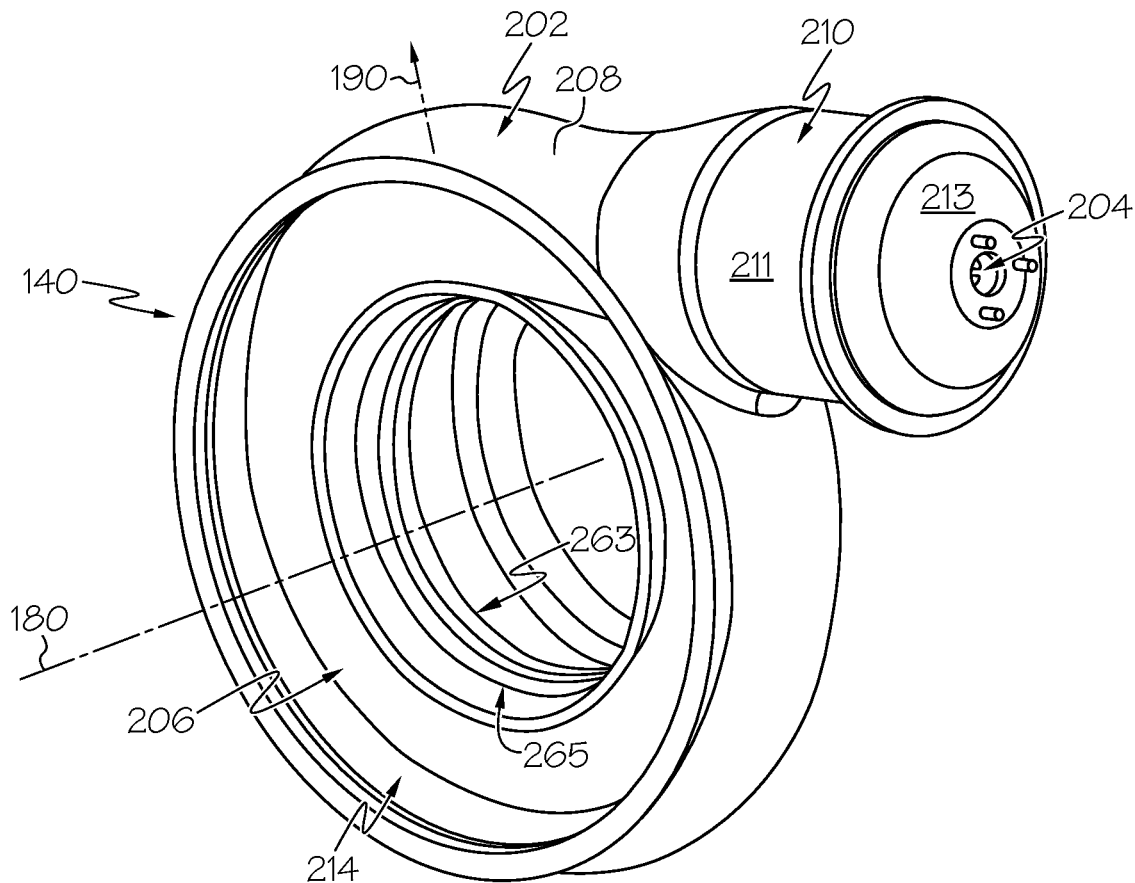
FIG. 2 is a front perspective view of a combustion section for a gas turbine engine according to example embodiments of the present disclosure.
Figure 3:
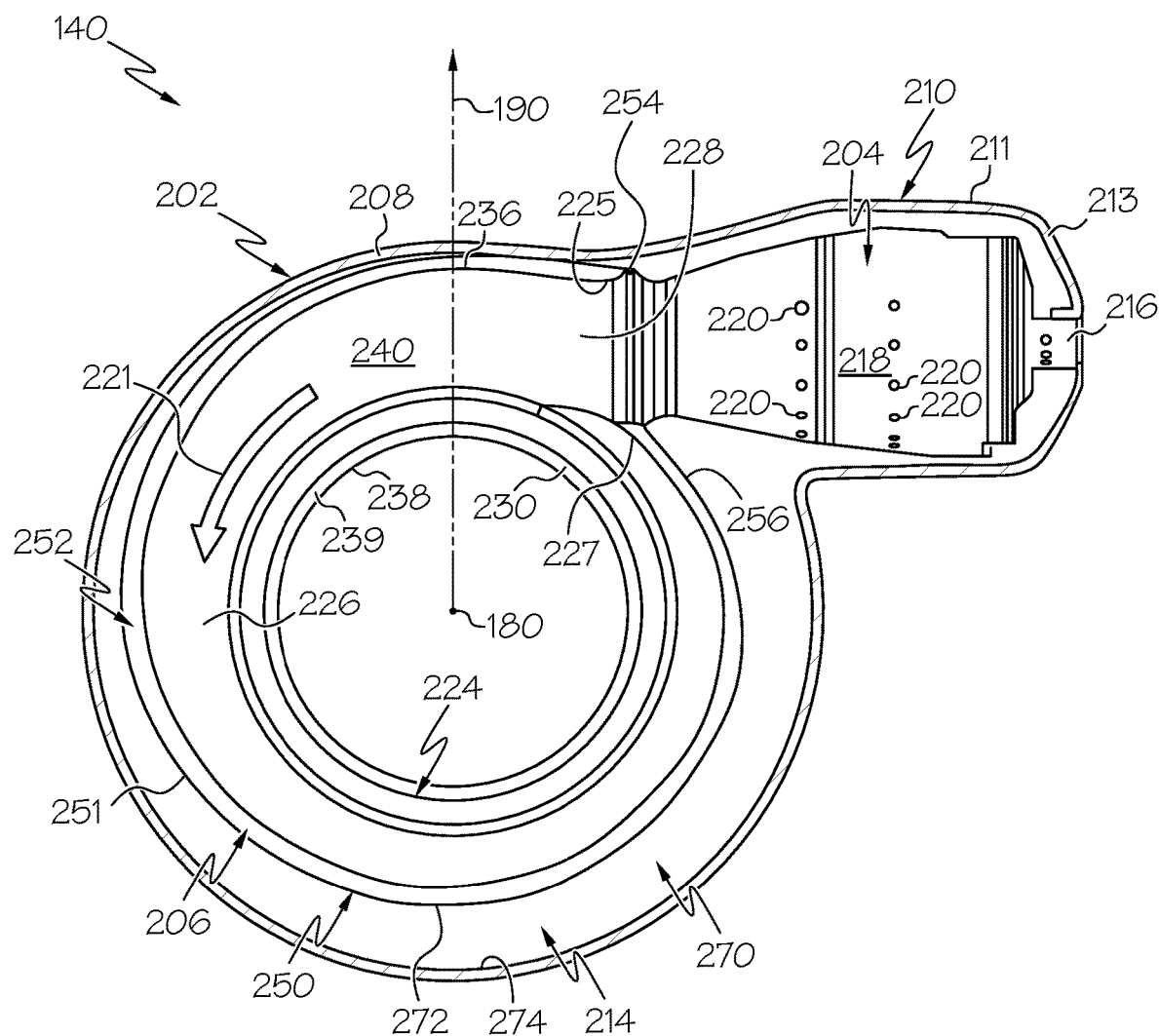
FIG. 3 is a cross section of the combustion section of FIG. 2.

Referring now to FIGS. 2 and 3, the combustion section 140 for a gas turbine engine is illustrated according to example embodiments of the present disclosure. The combustion section 140 may be included in the gas turbine engine 100 represented in FIG. 1. Generally, the combustion section 140, includes a combustor case 202, a combustor 204, and a turbine scroll assembly 206. In the embodiment illustrated, there is only one combustor 204 (i.e., a can combustor shown in a tangential or "sore thumb" configuration). However, it will be appreciated that the combustion section 140 may be configured differently without departing from the scope of the present disclosure. For example, the combustion section 140 may include a plurality of combustors. Also, the combustor(s) could extend along the longitudinal axis 180 or at a different angle relative to the combustor case 202.

As shown in FIG. 2, the combustor case 202 may include a first portion 208 and a second portion 210. The first portion 208 may be annular in shape and may have a substantially constant radius with respect to the longitudinal axis 180. The first portion 208 may be substantially centered about the longitudinal axis 180. The second portion 210 may include a hollow can 211 and an end cap 213 mounted on one end of the can 211. The opposite end of the can 211 may be connected to the first portion 208 of the combustor case 202 such that the second portion 210 projects substantially tangentially from the first portion 208. As shown in FIG. 3, the first portion 208 and the second portion 210 may cooperate to define an interior space 214 within the combustor case 202. Also, the first portion 208 may house the turbine scroll assembly 206 within the interior space 214, and the second portion 210 may house the combustor 204 within the interior space 214.

As shown in FIG. 3, the combustor 204 may generally include an injector 216 and a body 218. The injector 216 may be a known fuel injector for injecting fuel within the body 218. The body 218 may define a hollow chamber that receives fuel from the injector 216. The body 218 may be mounted to and supported by the turbine scroll assembly 206 as will be discussed in detail below. Furthermore, the body 218 may include a plurality of ports 220 that extend therethrough. The ports 220 may allow air within the interior space 214 of the combustor case 202 to flow into the body 218 and ignite fuel injected by the injector 216. The exhaust gases then flow into the turbine scroll assembly 206.

Figure 4:
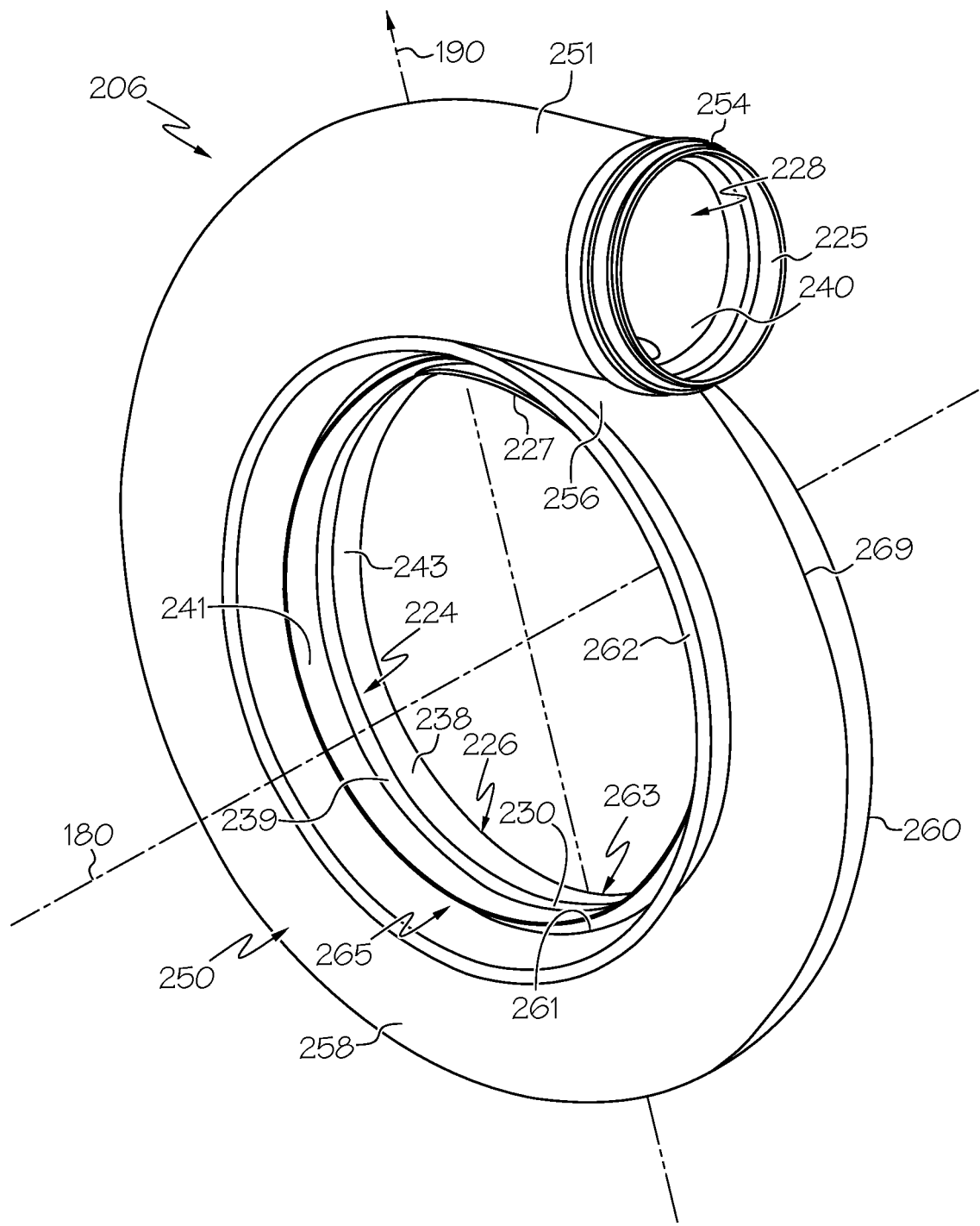
FIG. 4 is a perspective view of a turbine scroll assembly of the combustion section of FIG. 2 according to example embodiments of the present disclosure.
Figure 5:
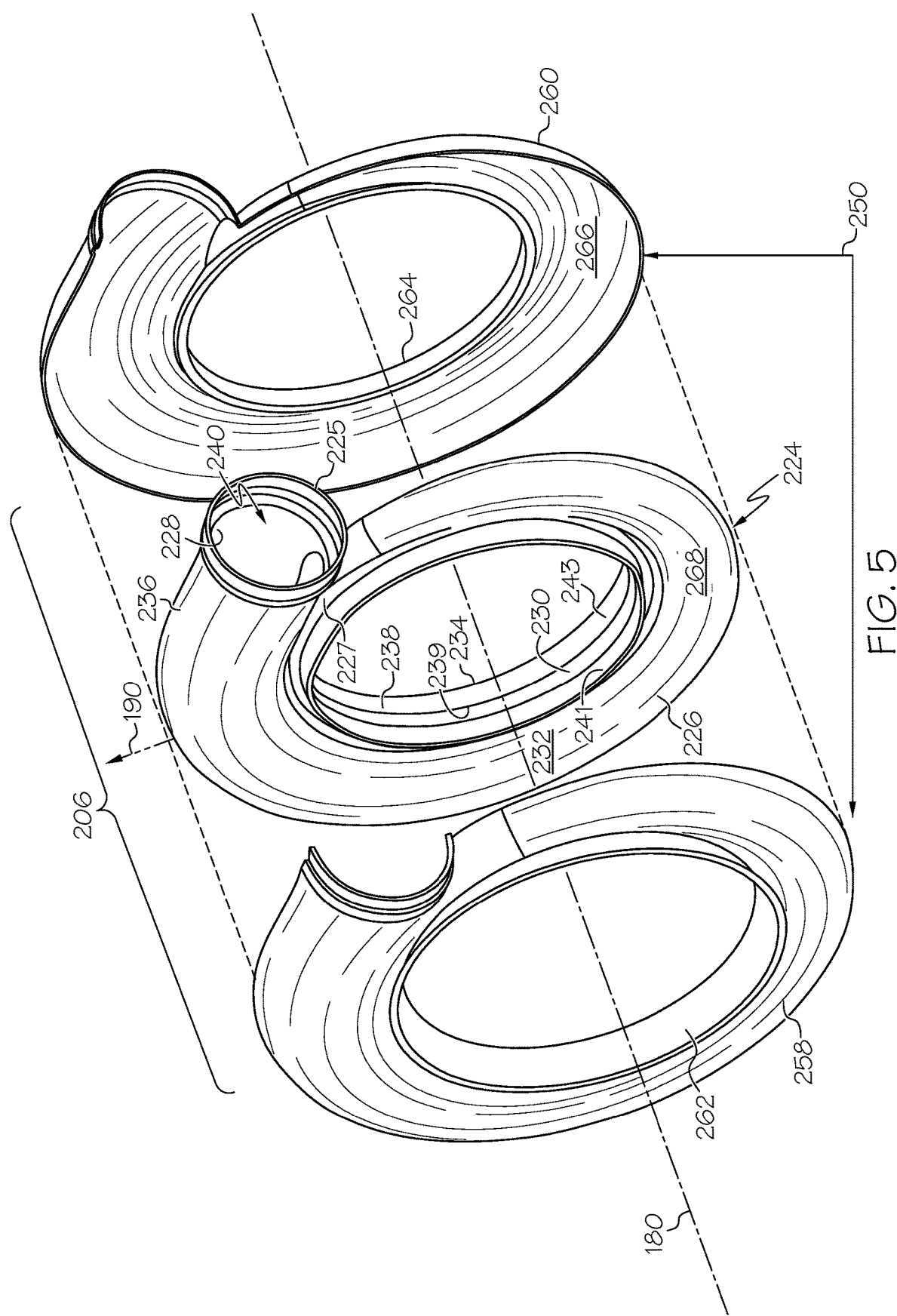
FIG. 5 is an exploded perspective view of the turbine scroll assembly of FIG. 4.
Figure 6:
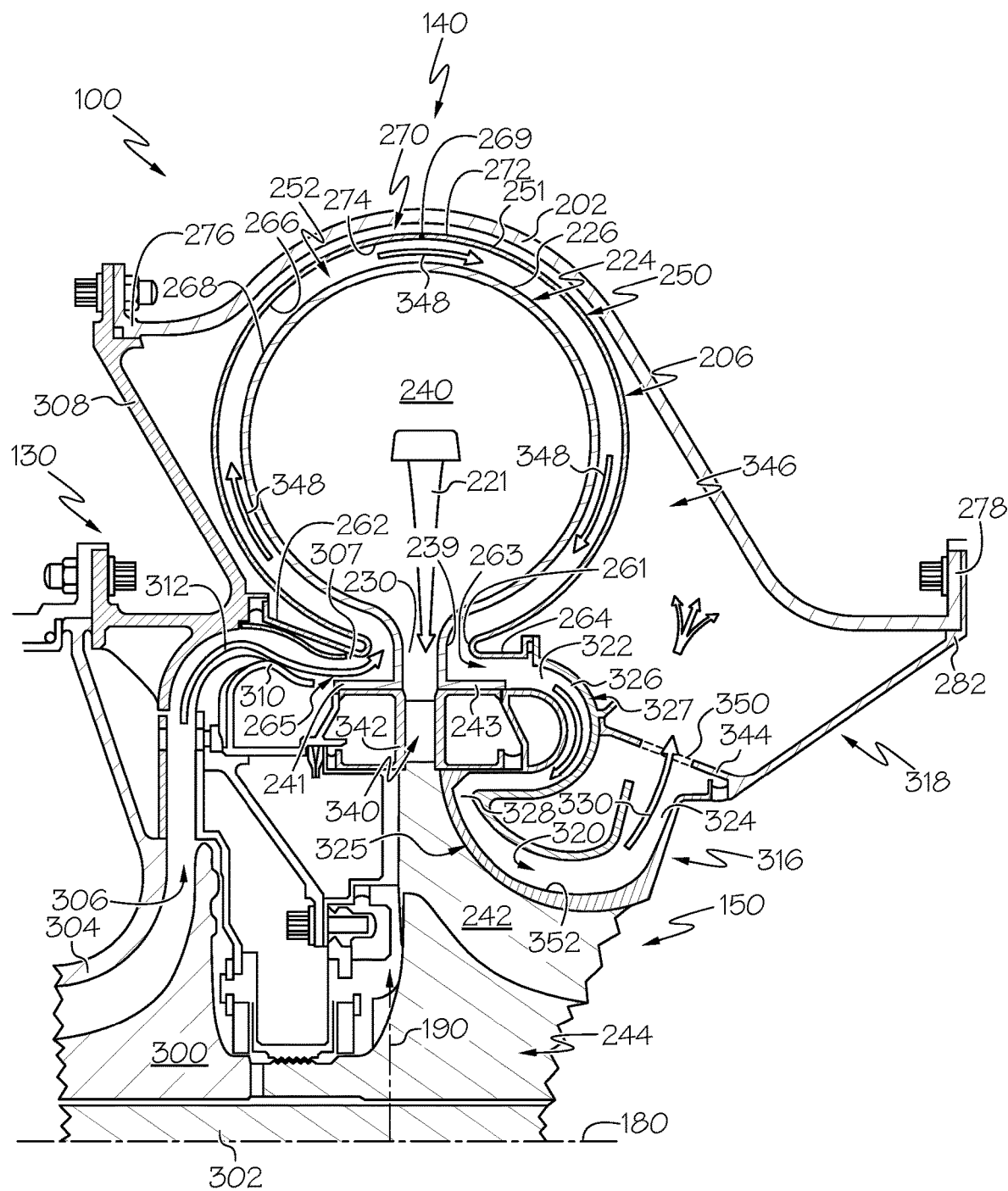
FIG. 6 is a cross sectional view of the combustion section of FIG. 2 shown interconnected with a compressor section and a turbine section of a gas turbine engine according to exemplary embodiments.

As shown in FIGS. 4 and 5, the turbine scroll assembly 206 may generally include a scroll 224 and a scroll baffle 250. As will be discussed, the scroll 224 receives exhaust flow from the combustor 204 and directs the flow toward a turbine rotor 242 (FIG. 6) of the turbine section 150 of the gas turbine engine 100. The scroll baffle 250 at least partially surrounds, encompasses, encloses, encapsulates, or otherwise extends about the scroll 224. As will be discussed in detail and as shown in FIG. 6, a scroll cooling passage 252 is defined between the scroll baffle 250 and the scroll 224. In some embodiments, the scroll cooling passage 252 directs core flow from the compressor section 130 about the scroll 224 such that the core flow from the compressor section 130 cools the scroll 224. In some embodiments, the cooling passage 252 may be in fluid communication with other components (e.g., components of the turbine section 150) such that flow from the scroll cooling passage 252 cools those components as well.

Referring to FIG. 5, the scroll 224 may be hollow and may include a peripheral wall 226 having a generally toroidal shape. The scroll 224 may include a front end 232 that faces forward along the longitudinal axis 180 and a rear end 234 that faces aft along the longitudinal axis 180. The scroll 224 may also have an outer diameter area 236 that faces radially outward, away from the longitudinal axis 180, and an inner diameter area 238 that faces radially inward, toward the longitudinal axis 180. In some embodiments, the scroll 224 may be made of a metallic material and may be formed, for example, via investment casting methods.

Also shown in FIG. 5, the peripheral wall 226 of the scroll 224 may have a hollow, tubular configuration. The peripheral wall 226 may spiral about the longitudinal axis 180 as it extends between a first end 225 and a second end 227. In the embodiment illustrated, the scroll 224 wraps circumferentially about the longitudinal axis 180 at a fixed location on the longitudinal axis 180. In other embodiments, the scroll 224 helically winds about the longitudinal axis 180. The peripheral wall 226 may define a hollow interior 240 of the scroll 224. The radial cross section of the interior 240 is shown in FIG. 6 according to some embodiments. The radial cross section of the interior 240 of the scroll 224 may be rounded (e.g., substantially circular) as shown in FIG. 6. In other embodiments, the radial cross section of the interior 240 may be kidney-shaped, elliptical, ovoid, or otherwise shaped. As is apparent from FIG. 3, the area of the radial cross section of the interior 240 may gradually and progressively change as the peripheral wall 226 extends circumferentially between the first end 225 and the second end 227. Specifically, the radial cross sectional area of the interior 240 may be greatest near the first end 225, and the cross-sectional area of the interior 240 may gradually decrease (e.g., in a substantially linear fashion) as the peripheral wall 226 spirals circumferentially about the longitudinal axis 180 toward the second end 227.

Furthermore, the peripheral wall 226 of the scroll 224 may define a scroll inlet 228 and a scroll outlet 230 of an interior scroll flow path that is represented by arrow 221 in FIGS. 3 and 6. Specifically, the first end 225 of the peripheral wall 226 may be open so as to define the scroll inlet 228. Also, as shown in FIG. 6, the outlet 230 may be defined by a projection 239 that projects radially inwardly from the inner diameter area 238 of the scroll 224. The outlet 230 may be a slot in the projection 239, and the outlet 230 may extend in the circumferential direction about at least a part of the inner diameter area 238. Also, in some embodiments, the peripheral wall 226 may include a forward flange 241 and a rear flange 243. The forward and rear flanges 241, 243 may be disposed proximate the inner diameter area 238, and the flanges 241, 243 may project from opposite sides of the outlet 230.

Referring to FIG. 3, the body 218 of the combustor 204 may be mounted proximate the inlet 228 such that exhaust gas from the combustor 204 flows into the scroll 224. The scroll 224 may direct the exhaust gas about the axis 180 and along the direction of arrow 221, and the exhaust gas may flow out of the scroll outlet 230.

Referring to FIG. 3 again, the turbine scroll assembly 206 may also include a baffle 250. In some embodiments, the shape of the baffle 250 may substantially correspond to that of the scroll 224. Thus, a peripheral wall 251 of the baffle 250 may be a hollow tube that spirals about the longitudinal axis 180 such that the baffle 250 has a substantially toroidal shape. The peripheral wall 251 may include a first end 254 and a second end 256. A radial cross sectional area of the interior of the baffle 250 may gradually reduce as the peripheral wall 251 extends about the longitudinal axis 180 from the first end 254 to the second end 256.

As shown in FIG. 5, the baffle 250 may include a first member 258 and a second member 260 that cooperate to define the baffle 250 and that cooperate to surround the scroll 224. In some embodiments, the first member 258 and the second member 260 may substantially mirror each other with respect to an imaginary plane that is parallel to the radial axis 190 and perpendicular to the longitudinal axis 180. The first member 258 and the second member 260 may be attached at an outer diameter junction 269 (FIGS. 4 and 6). The junction 269 may extend in the circumferential direction about the baffle 250. Also, the junction 269 may include a weldment, fasteners, or other attachments between the first and second members 258, 260. Additionally, the first end 254 of the baffle 250 may encompass the first end 225 of the scroll 224. In some embodiments, the first end 254 of the baffle 250 may be attached to the first end 225 of the scroll 224 so as to close off the scroll cooling passage 252 proximate the first end 225 of the scroll 224. The baffle 250 may also include an inner diameter opening 261 (FIGS. 4 and 6) between the first and second members 258, 260. The inner diameter opening 261 may be a gap defined between the first member 258 and the second member 260 of the baffle 250. The inner diameter opening 261 may extend in the circumferential direction about the axis 180 of the baffle 250. Referring to FIG. 5, the first member 258 of the baffle 250 may include a forward flange 262, and the second member 260 of the baffle 250 may include a rear flange 264. The forward and rearward flanges 262, 264 may be annular and may project in opposite directions from the inner diameter opening 261 (FIGS. 4 and 6) of the baffle 250.

Referring to FIG. 5, the baffle 250 may house, encompass, encapsulate, or otherwise surround at least a part of the scroll 224. Specifically, in some embodiments, the first member 258 of the baffle 250 may cover over the front end 232, the second member 260 of the baffle 250 may cover over the rear end 234, and the first and second members 258, 260 may cooperate to cover over the outer diameter area 236 of the scroll 224. Also, as shown in FIGS. 4 and 6, the projection 239 and the flanges 241, 243 of the scroll 224 may project out of the inner diameter opening 261 of the baffle 250. Accordingly, the opening 261 may provide fluid access for the flow from the outlet 230 of the interior scroll flow path 221.

The baffle 250 may correspond in shape to that of the scroll 224; however, the baffle 250 may be slightly larger than that of the scroll 224. As shown in FIG. 6, an inner surface 266 of the baffle 250 may be spaced apart from an opposing outer surface 268 of the scroll 224. Accordingly, an inlet 265 to the scroll cooling passage 252 may be defined between the forward flange 262 of the baffle 250 and the forward flange 241 of the scroll 224. Likewise, an outlet 263 to the scroll cooling passage 252 may be defined between the rear flange 264 of the baffle 250 and the rear flange 243 of the scroll 224. In some embodiments, the scroll cooling passage 252 may direct flow in a toroidal direction about the scroll 224 as represented by arrows 348 in FIG. 6. Also, in some embodiments, the cross-sectional area of the scroll cooling passage 252 (FIG. 6) may be substantially uniform and constant in the circumferential direction about the axis 180.

Additionally, as shown in FIGS. 3 and 6, the turbine scroll assembly 206 may be housed, encompassed, enclosed, or otherwise surrounded by the combustor case 202. The combustor case 202 may be spaced apart from the scroll assembly 206, and a collector space 270 may be defined between the outer surface 272 of the baffle 250 and the inner surface 274 of the combustor case 202. As shown in FIG. 3, the radial distance between the outer surface 272 and the inner surface 274 increases gradually as the collector space 270 extends in the circumferential direction from the first end 254 to the second end 256. Thus, the radial cross sectional area of the collector space 270 increases gradually and progressively in this circumferential direction from the first end 254 to the second end 256.

Referring now to FIG. 6, the engine 100 will be discussed in greater detail. Specifically, the compressor section 130, the turbine section 150, and the interconnection of the combustion section 140 will be discussed according to exemplary embodiments of the present disclosure.

Generally, the compressor section 130 may include an impeller 300 that rotates about the longitudinal axis 180. The impeller 300 may be mounted to a shaft 302 that extends along the axis 180. The compressor section 130 may additionally include a shroud 304 with an inner surface that faces the impeller 300. Moreover, the compressor section 130 may include a support structure 308 that is connected and that supports the shroud 304 and/or other adjacent components. Furthermore, the compressor section 130 may include an end member 310.

As the impeller 300 rotates about the axis 180, air is compressed and flows along a compressor flow path 306. Flow along this path is indicated by arrow 312. As shown, the compressor flow path 306 is defined along an inner surface of the shroud 304, along the support structure 308, and along the end member 310.

Additionally, the compressor section 130 may be fixed to the turbine scroll assembly 206. More specifically, the support structure 308 may be attached to the forward flange 262 of the baffle 250. Also, the end member 310 may be attached to the forward flange 241 of the scroll 224. Accordingly, as shown in FIG. 6, an outlet 307 of the compressor flow path 306 may be fluidly connected to the scroll cooling passage 252.

Furthermore, the support structure 308 of the compressor section 130 may be fixed to a forward end 276 of the combustor case 202. In some embodiments, the support structure 308 may be a barrier that further defines areas of the collector space 270 that are disposed forward of the scroll assembly 206.

The turbine section 150 of the engine 100 includes a rotor 244 with a plurality of rotor blades, one of which is indicated at 242. The turbine section 150 may additionally include a rotor blade shroud 316 and a support structure 318. The rotor 244 may be mounted for rotation about the axis 180. The rotor 244 may be supported on the shaft 302.

Additionally, the rotor blade shroud 316 may include a shroud cooling passage 320 extending therethrough. The shroud cooling passage 320 may include an inlet 322 and an outlet 324. The passage 320 may additionally include one or more turns 326, 328, 330, which re-direct the air flowing through the passage 320. As shown in FIG. 6, the shroud cooling passage 320 may include a first turn 326 proximate the inlet 322, a second turn 328 further downstream, and a third turn 330 that is disposed proximate the outlet 324. The rotor blade shroud 316 may be connected to and supported by the support structure 318. In some embodiments, the rotor blade shroud 316 may include an outer wall structure 327 and an inner wall structure 325. The inner and outer wall structures 325, 327 may be separated from each other to define the shroud cooling passage 320 therebetween. One end of the outer wall structure 327 may be attached to the baffle 250 (e.g., to the rear flange 264 of the baffle 250). An opposite end of the outer wall structure 327 may be disposed proximate the outlet 324. One end of the inner wall structure 325 may be attached to rear flange 243 of the scroll 224. An opposite end of the inner wall structure 325 may be disposed proximate the outlet 324 and attached to the support structure 318. Thus, the inner and outer wall structure 325, 327 may collectively define the inlet 322 and the outlet 324 of the shroud cooling passage 320. Accordingly, as shown in FIG. 6, the inlet 322 of the shroud cooling passage 320 may be fluidly connected to the scroll cooling passage 252.

The turbine section 150 may also include an exhaust passage 340 that is fluidly connected to the outlet 230 of the scroll 224. The exhaust passage 340 receives exhaust gas flow from the interior 240 of the scroll 224. A turbine nozzle 342 may be disposed within the exhaust passage 340.

Figure 7:
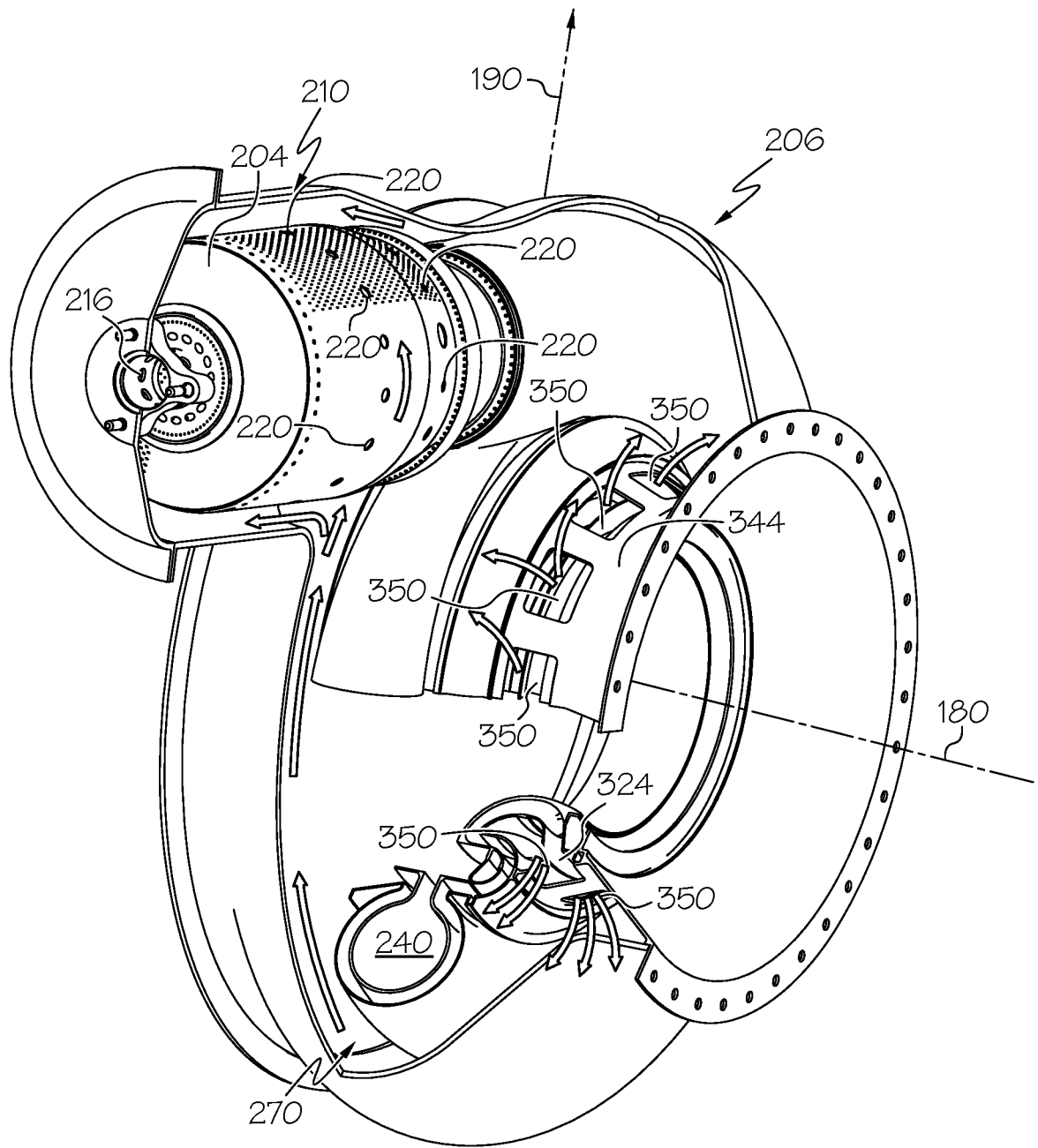
FIG. 7 is a rear cut-away perspective view of the combustion section and turbine section of FIG. 6 according to example embodiments of the present disclosure.

Furthermore, the support structure 318 of the turbine section 150 may be fixed to a rear end 278 of the combustor case 202. Also, in some embodiments, a support structure 344 extends between and connects support structure 318 and the outer wall structure 327 of the shroud cooling passage 327. Support structure 344 may include one or more perforations 350 which allows the cooling air flowing through the shroud cooling passage 320 to exit the outlet 324 and pass through the support structure 344. A plurality of the perforations 350 are shown in FIG. 7 according to an example embodiment. As shown, the perforations 350 may be substantially square or rectangular; however, it will be appreciated that the perforations 350 may be circular, elliptical, or another shape without departing from the scope of the present disclosure. Also, the perforations 350 may be spaced apart in the circumferential direction about the axis 180. The perforations 350 may be equally spaced apart about the axis 180, or spacing between adjacent perforations 350 may vary about the axis 180.

In some embodiments, the inner surface of the combustor case 206, the support structure 344, the rearward side of the baffle 250 and a portion of the rotor blade shroud 316 may cooperate to define a rear plenum 346. As shown in FIG. 6, the rear plenum 346 may be fluidly connected to the outlet 324 of the passage 320 via the perforation 350. Moreover, the rear plenum 346 may be fluidly connected to the collector space 270 described above. As such, the plenum 346 may fluidly connect the shroud cooling passage 320 to the collector space 270 in some embodiments. In other words, flow from the shroud cooling passage 320 may flow into and collect within the plenum 346 and then flow into the collector space 270 to be delivered to the combustor 204.

Thus, during operation of the engine 100, the compressor section 130 may compress and move air along the compressor flow path 306. The compressor section 130 may direct flow toward outlet 307 and into the inlet 265 of the scroll cooling passage 252. The air may flow substantially in a toroidal direction about the scroll 224 as indicated by arrows 348. In other words, and in reference to FIG. 5, the flow may be directed from the inner diameter area 238, proximate the front end 232, then the flow may be directed in the toroidal direction toward the outer diameter area 236 and back toward the inner diameter area 238, proximate the rear end 234. This flow may provide a cooling effect on the scroll 224. Referring to FIG. 6, this air may exit the scroll cooling passage 252 via the outlet 263 and enter the shroud cooling passage 320, thereby cooling the rotor blade shroud 316. As shown in FIGS. 6 and 7, airflow from the shroud cooling passage outlet 324 may pass through the perforations 350 and flow into the rear plenum 346. The air may fill the rear plenum 346 and may also move into the collector space 270 (FIGS. 3, 6, and 7). More specifically, the airflow through the perforations 350 may flow generally in the radial and circumferential direction as it passes through the volume of the rear plenum 346, the collector space 270 and the space between the combustor case 210 and the combustor 204. The ports 220 of the combustor 204 fluidly connect the rear plenum 346 and the collector space 270 to an interior of the combustor 204 and the interior scroll flow path 221. Thus, air within the rear plenum 346 and/or the collector space 270 moves through the ports 220 (FIG. 3) into the combustor 204. Fuel from the injector 216 ignites, and the exhaust gas flows circumferentially along the interior 240 of the scroll 224, through the outlet 230 and nozzle 342 toward the turbine rotor 244. This, in turn, rotatably drives the turbine rotor 244 and the shaft 302.

As mentioned, the engine 100 includes various cooling passages, pathways, plenums, collectors, etc. that provide a cooling effect for respective structures of the engine 100. They may provide various advantages.

For example, the scroll cooling passage 252 may receive core flow from the compressor section 130 and provide cooling to the scroll 224. In some embodiments, the scroll cooling passage 252 may be directly attached to the compressor flow path 306 such that the scroll cooling passage 252 receives core flow from the compressor section 130. This provides more cooling capability than can be accomplished by introducing core flow bleed air into the scroll cooling passage 252. In other words, the full core flow from the compressor section 130 may be maintained and delivered to the scroll cooling passage 252 to cool the scroll 224. In some embodiments, the scroll cooling passage 252 may receive substantially all of the core flow from the compressor section 130.

Also, in some embodiments, the peripheral wall 226 of the scroll 224 may be continuous along the scroll cooling passage 252 between the inlet 265 and the outlet 263. Likewise, the peripheral wall 251 of the baffle 250 may be continuous along the scroll cooling passage 252 between the inlet 265 and the outlet 263. As such, the peripheral wall 226 may act as a barrier, blocking the flow along the scroll cooling passage 252 from entering the interior scroll flow path 221. Similarly, the peripheral wall 251 may act as a barrier, blocking the flow along the scroll cooling passage 252 from entering the outer space 270 and the rear plenum 346. In other words, the scroll assembly 206 need not include effusion cooling holes that extend through the thickness of the peripheral wall 226 of the scroll 224 and/or impingement holes in the peripheral wall 251 of the baffle 250 (i.e., the peripheral walls 226, 251 may be continuous, unperforated, or otherwise free of such effusion or impingement cooling apertures). The peripheral walls 226, 251 may be continuous in both the toroidal direction as well as the circumferential direction. Thus, the flow through the scroll cooling passage 252 may cool the scroll 224 via convective cooling and flow along the exterior surface of the peripheral wall 226 in the toroidal direction (i.e., backside convective cooling of the scroll 224).

Because the peripheral walls 226, 251 are continuous (i.e., without effusion and/or impingement cooling holes), the scroll assembly 206 may exhibit increased strength and robustness. Also, the scroll assembly 206 may have increased manufacturability since effusion and/or impingement holes may be unnecessary. Furthermore, flow through the scroll assembly 206 may be more controllable since the cooling passage 252 relies on convective cooling instead of effusion and/or impingement cooling. Additionally, cooling of the scroll assembly 206 may be ensured since it may not include effusion and/or impingement holes, which may be susceptible to clogging or blockage due to dust, debris, etc.

It will be appreciated that, in other embodiments, effusion and/or impingement holes may be included. For example, these holes may be included in localized areas to provide localized cooling to predetermined areas (e.g., areas of the scroll).

Furthermore, the scroll cooling passage 252 may be fluidly connected to the shroud cooling passage 320 of the rotor blade shroud 316. Accordingly, core flow from the compressor section 130 may be used to cool both the scroll 224 as well as the rotor blade shroud 316. This may increase cooling efficiency. Also, this may allow the engine 100 to be relatively compact and less complex.

Additional example embodiments of the present disclosure will now be discussed. In some embodiments, the outer surface 268 of the scroll 224 and/or the inner surface 266 of the baffle 250 may include dimples, bumps, projections, or other surface variations. These features may be configured to reduce or eliminate any boundary layer of the flow through the scroll cooling passage 252 to increase heat transfer. These surface features may also be included at local areas of the scroll cooling passage 252 to increase heat transfer at those areas. Additionally, standoff features may be included that are used to control the radial gap between the outer surface 268 of the scroll 224 and the inner surface 266 of the baffle 250. These standoff features could be dispersed on the outer surface 268 of the scroll 224 and/or the inner surface 266 of the baffle 250. The plurality of dispersed standoff features could essentially be radial structures that could be localized structures, continuous rib-like structures, or another structure. These structures could also be used to provide local flow control of the scroll cooling passage 252 for improving the scroll 224 cooling. In some embodiments, the turbine rotor blade shroud outer cooling wall 352 may include dimples, bumps, projections, or other surface variations. These features may be configured to reduce or eliminate any boundary layer of the flow through the shroud cooling passage 320 to increase heat transfer.

Figure 8:
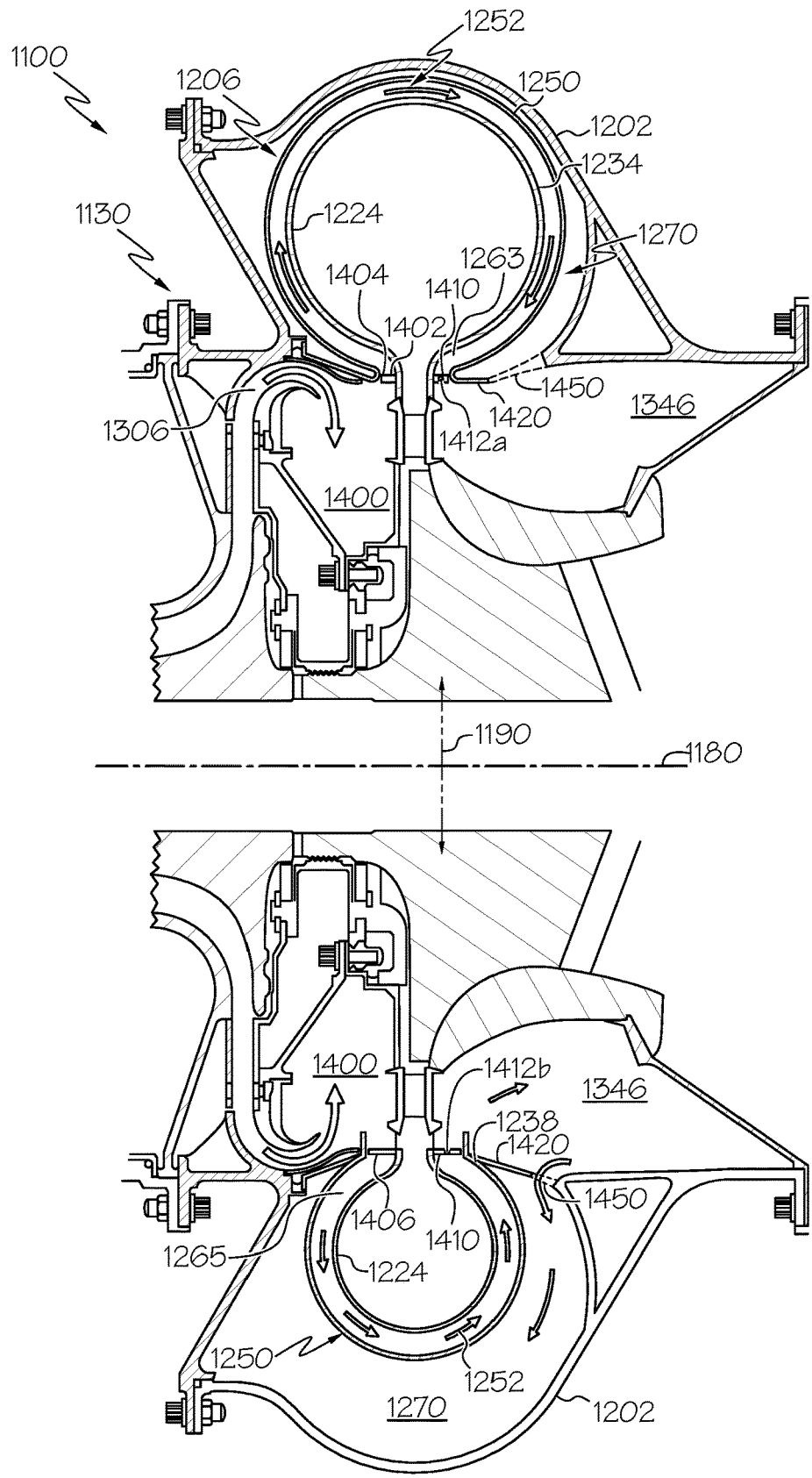
FIG. 8 is a longitudinal cross section of a gas turbine engine according to additional example embodiments of the present disclosure.

Referring now to FIG. 8, additional embodiments of the engine 1100 will be discussed according to example embodiments. Components that correspond to those discussed above will be indicated with corresponding reference numbers increased by 1000.

The scroll cooling passage 1252 is shown in FIG. 8 according to an example embodiment. As will be discussed in detail, the engine 1100 may include an inlet flow control member 1402 and an outlet flow control member 1410 that affect flow through the scroll cooling passage 1252. It will be appreciated that the toroidal path length of the scroll cooling passage 1252 about the scroll 1224 varies in the circumferential direction from the inlet flow control member 1402 to the outlet flow control member 1410. (This variation in the scroll cooling passage 1252 toroidal path length can be seen in the upper and lower section cuts of FIG. 8 (i.e., the sections on opposite sides of the axis 1180).) This variation in the scroll cooling passage 1252 torodial path length produces less resistance to the cooling flow when the scroll cooling passage 1252 toroidal length is shorter than when the scroll cooling passage 1252 toroidal length is longer. This variation in scroll cooling flow resistance results in a circumferential flow migration from the scroll cooling passage 1252 that is torodially longer to the scroll cooling passage 1252 that is torodially shorter. This circumferential flow migration of the scroll cooling passage 1252 flow could affect the range and stability of the compressor 1130 by producing a compressor exit distortion and/or provide inadequate cooling of the scroll 1224. Several features are now discussed that can affect this circumferential flow migration. These features can be used to minimize the circumferential flow migration or to create a preferred circumferential flow, to cool the scroll 1224 without causing range or stability problems for the compressor 1130.

As shown in FIG. 8, the engine 1100 may include a midframe plenum 1400. In some embodiments, the midframe plenum 1400 may be defined between the compressor section 1130 and the scroll assembly 1206. The midframe plenum 1400 may be disposed between the compressor flow path 1306 and the scroll cooling passage 1252. Accordingly, air from the compressor flow path 1306 may flow into and collect within the midframe plenum 1400 before flowing into the scroll cooling passage 1252. This may provide uniform static pressure at the scroll cooling passage inlet 1265 as well as the compressor flow path exit 1306. Also, the midframe plenum 1400 may cause flow from the compressor flow path 1306 to turn radially inboard toward the longitudinal axis 1180, flow into the midframe plenum 1400 to create uniform pressure, allowing the flow to evenly redistribute circumferentially within the midframe plenum 1440 before entering the scroll cooling passage 1252.

Additionally, the engine 1100 may include the inlet flow control member 1402 mentioned above. The inlet flow control member 1402 may be annular and may extend circumferentially about the longitudinal axis 1108. Additionally, the inlet flow control member 1402 may include a plurality of vanes 1404, 1406, two of which are indicated in FIG. 8. As shown, the vanes 1404, 1406 may be spaced apart and arranged in a circumferential direction about the longitudinal axis 1108. The vane 1404 is disposed at an opposite circumferential position from the vane 1406 in FIG. 8, for example. It will be appreciated that additional vanes may be included and spaced apart circumferentially from the vanes 1404, 1406. The inlet flow control member 1402 may be disposed proximate the inlet 1265 of the scroll cooling passage 1252. In the embodiment shown, for example, the inlet flow control member 1402 is disposed within the inlet 1265 and is fixed between the scroll 1224 and the baffle 1250. The plurality of vanes 1404, 1406 may cooperate to direct flow in a predetermined direction into the inlet 1265 of the scroll cooling passage 1252. In some embodiments, core flow from the midframe plenum 1400 flows between the vanes 1404, 1406, and the vanes 1404, 1406 direct the flow substantially in the toroidal direction (inhibiting flow in the circumferential direction or creating a preferred flow direction) to increase cooling effect and/or to maintain a uniform static pressure at the inlet 1265.

Moreover, the engine 1100 may further include the outlet flow control member 1410 mentioned above. The outlet flow control member 1410 may be disposed proximate an outlet 1263 of the scroll cooling passage 1252. The outlet flow control member 1410 may be annular and may extend circumferentially about the longitudinal axis 1180. In some embodiments, the outlet flow control member 1410 may include a plurality of apertures, two of which are indicated at 1412a and 1412b in FIG. 8. The apertures 1412a, 1412b may be spaced apart and arranged in a circumferential direction about the longitudinal axis 1180. The aperture 1412a is disposed at an opposite circumferential position from the aperture 1412b. It will be understood that there may be additional apertures spaced circumferentially between the apertures 1412a, 1412b. The outlet flow control member 1410 may be disposed proximate the outlet 1263 of the scroll cooling passage 1252. In the embodiment shown, for example, the outlet flow control member 1410 is disposed within the outlet 1263 and is fixed between the scroll 1224 and the baffle 1250. The plurality of apertures 1412a, 1412b may cooperate to meter the flow (i.e., provide flow metering) through the scroll cooling passage 1252 at the outlet 1263 of the scroll cooling passage 1252. Alternatively, the outlet flow control member 1410 may be a continuous ring in the circumferential direction that varies in thickness and controls the area of the outlet 1263 to provide flow metering and circumferential flow migration control. In this case, there may be a gap between the ring and the scroll 1224 so that scroll cooling flow may pass from the scroll cooling passage 1252 into the rear plenum 1346.

Furthermore, as shown in FIG. 8, the engine 1100 may include a rear member 1420. In some embodiments, the rear member 1420 may be a thin-walled member that is integrally attached with the combustor case 1202. The rear member 1420 may extend over and substantially cover the baffle 1250, proximate the inner diameter area 1238 and the rear end 1234. The rear member 1420 may be disposed between the rear plenum 1346 and the collector space 1270. Additionally, the rear member 1420 may include a plurality of perforations 1450 that are spaced apart in the circumferential direction on the rear member 1420. The plurality of perforations 1450 may allow cooling flow to pass from the exit plenum 1346 to the collector space 1270. The shape of the perforations 1450 may be, for example, square, rectangular, circular, elliptical, or another shape. The plurality of perforations 1450 may be dispersed uniformly or non-uniformly in the circumferential direction.

Accordingly, the embodiment of FIG. 8 may provide uniform static pressure at the inlet 1265, flow metering at the outlet 1263. Also, the plenums 1400, 1346 avoid/reduce static pressure distortion at the inlet 1265 and the outlet 1263. Thus, local backpressure regions are not created that can cause compressor stall/surge issues. Also, the flow that is drawn locally from the plenum 1346 to supply the combustor 1204 will be less likely to create static pressure distortion in the plenum 1346.

While at least one exemplary embodiment has been presented in the foregoing detailed description, it should be appreciated that a vast number of variations exist. For example, the inlet flow control member 1402 of FIG. 8 could be used even if the engine does not include the midframe plenum 1400; the midframe plenum 1400 could be included without including the inlet flow control member 1402; the exit flow control member 1410 could be included even if the exit plenum 1346 is not included; the exit plenum 1346 could be included without including exit flow control member 1410; the exit flow control member 1410 could be included with a rotor blade shroud cooling scheme, etc. It should also be appreciated that the exemplary embodiment or exemplary embodiments are only examples, and are not intended to limit the scope, applicability, or configuration of the present disclosure in any way. Rather, the foregoing detailed description will provide those skilled in the art with a convenient road map for implementing an exemplary embodiment of the present disclosure. It is understood that various changes may be made in the function and arrangement of elements described in an exemplary embodiment without departing from the scope of the present disclosure as set forth in the appended claims.

What is claimed is:

1. A gas turbine engine with a longitudinal axis comprising:
   a compressor section that defines a compressor flow path;
   a combustion section that includes a scroll, a scroll baffle, and a combustor, the scroll defining an interior scroll flow path, the scroll baffle surrounding at least part of the scroll to define a scroll cooling passage between the scroll baffle and the scroll;
   a turbine section with a turbine rotor and a turbine rotor blade shroud, the turbine rotor blade shroud including a shroud cooling passage;
   a mid-frame plenum with a plenum inlet, a plenum outlet, and a plenum interior space, the mid-frame plenum fluidly connecting the compressor flow path to the scroll cooling passage, the plenum interior space configured to collect air from the compressor flow path before passage to the scroll cooling passage, the mid-frame plenum extending at least partly about the longitudinal axis in a circumferential direction, the plenum interior space disposed radially inboard of the plenum inlet and the plenum outlet, the mid-frame plenum defining a mid-frame flow path from the plenum inlet to the plenum outlet, the mid-frame flow path directed in a radially inboard direction from the plenum inlet into the plenum interior space, and in a radially outboard direction to the plenum outlet and into the scroll cooling passage;

the combustion section being coupled to the turbine section with the scroll cooling passage fluidly connected to the shroud cooling passage to direct flow from the scroll cooling passage along the shroud cooling passage to cool the turbine rotor blade shroud; and a plurality of outlet flow control apertures that are disposed proximate an outlet of the scroll cooling passage and that are spaced apart and arranged in a circumferential direction about the longitudinal axis, the plurality of outlet flow control apertures are operable to meter the flow through the scroll cooling passage.

2. The gas turbine engine of claim 1, further comprising a rear plenum that is fluidly connected to and downstream of the shroud cooling passage.

3. The gas turbine engine of claim 2, further comprising a rear member disposed between the rear plenum and a collector space, the rear member including at least one opening allowing flow from the rear plenum, through the rear member, and into the collector space.

4. The gas turbine engine of claim 1, wherein the scroll cooling passage is a convective cooling passage configured to convectively cool the scroll.

5. The gas turbine engine of claim 4, wherein the interior scroll flow path includes an inlet and an outlet;
wherein the scroll includes a peripheral wall that is continuous from the inlet to the outlet and that is a barrier separating the scroll cooling passage from the interior scroll flow path; and
wherein the scroll baffle is continuous from the inlet to the outlet.

6. The gas turbine engine of claim 1, wherein the scroll cooling passage has a generally toroidal shape with an inner diameter area and an outer diameter area, the scroll cooling passage directing flow in a toroidal direction about the scroll from the inner diameter area, toward the outer diameter area, and back toward the inner diameter area.

7. The gas turbine engine of claim 1, further comprising a plurality of inlet flow control vanes disposed proximate an inlet of the scroll cooling passage, the plurality of inlet flow control vanes spaced apart and arranged in a circumferential direction about the longitudinal axis proximate the inlet of the scroll cooling passage;
wherein the plurality of inlet flow control vanes direct flow into the inlet of the scroll cooling passage.

8. A gas turbine engine with a longitudinal axis comprising:
a compressor section that defines a compressor flow path;
a combustion section that includes a scroll, a scroll baffle, and a combustor, the scroll defining an interior scroll flow path, the scroll baffle surrounding at least part of the scroll to define a scroll cooling passage between the scroll baffle and the scroll;
a turbine section with a turbine rotor and a turbine rotor blade shroud, the turbine rotor blade shroud including a shroud cooling passage;
a mid-frame plenum with a plenum inlet, a plenum outlet, and a plenum interior space, the mid-frame plenum fluidly connecting the compressor flow path to the scroll cooling passage, the plenum interior space configured to collect air from the compressor flow path before passage to the scroll cooling passage, the mid-frame plenum extending at least partly about the longitudinal axis in a circumferential direction, the plenum interior space disposed radially inboard of the plenum inlet and the plenum outlet, the mid-frame plenum defining a mid-frame flow path from the plenum inlet to the plenum outlet, the mid-frame flow path directed in a radially inboard direction from the plenum inlet into the plenum interior space, and in a radially outboard direction to the plenum outlet and into the scroll cooling passage;

the combustion section being coupled to the turbine section with the scroll cooling passage fluidly connected to the shroud cooling passage to direct flow from the scroll cooling passage along the shroud cooling passage to cool the turbine rotor blade shroud;

the scroll cooling passage being a convective cooling passage configured to convectively cool the scroll; and the interior scroll flow path including an inlet and an outlet, the scroll including a peripheral wall that is continuous from the inlet to the outlet and that is a barrier separating the scroll cooling passage from the interior scroll flow path, the scroll baffle being continuous from the inlet to the outlet.

9. The gas turbine engine of claim 8, further comprising a rear plenum that is fluidly connected to and downstream of the shroud cooling passage.

10. The gas turbine engine of claim 9, further comprising a rear member disposed between the rear plenum and a collector space, the rear member including at least one opening allowing flow from the rear plenum, through the rear member, and into the collector space.

11. The gas turbine engine of claim 8, further comprising a plurality of inlet flow control vanes disposed proximate an inlet of the scroll cooling passage, the plurality of inlet flow control vanes spaced apart and arranged in a circumferential direction about the longitudinal axis proximate the inlet of the scroll cooling passage;
wherein the plurality of inlet flow control vanes direct flow into the inlet of the scroll cooling passage.

12. A gas turbine engine with a longitudinal axis comprising:
a compressor section that defines a compressor flow path;
a combustion section that includes a scroll, a scroll baffle, and a combustor, the scroll defining an interior scroll flow path, the scroll baffle surrounding at least part of the scroll to define a scroll cooling passage between the scroll baffle and the scroll;
a turbine section with a turbine rotor and a turbine rotor blade shroud, the turbine rotor blade shroud including a shroud cooling passage;
a mid-frame plenum with a plenum inlet, a plenum outlet, and a plenum interior space, the mid-frame plenum fluidly connecting the compressor flow path to the scroll cooling passage, the plenum interior space configured to collect air from the compressor flow path before passage to the scroll cooling passage, the mid-frame plenum extending at least partly about the longitudinal axis in a circumferential direction, the plenum interior space disposed radially inboard of the plenum inlet and the plenum outlet, the mid-frame plenum defining a mid-frame flow path from the plenum inlet to the plenum outlet, the mid-frame flow path directed in a radially inboard direction from the plenum inlet into the plenum interior space, and in a radially outboard direction to the plenum outlet and into the scroll cooling passage;

the combustion section being coupled to the turbine section with the scroll cooling passage fluidly connected to the shroud cooling passage to direct flow from the scroll cooling passage along the shroud cooling passage to cool the turbine rotor blade shroud; and the scroll cooling passage having a generally toroidal shape with an inner diameter area and an outer diameter area, the scroll cooling passage directing flow in a toroidal direction about the scroll from the inner diameter area, toward the outer diameter area, and back toward the inner diameter area.

13. The gas turbine engine of claim 12, further comprising a rear plenum that is fluidly connected to and downstream of the shroud cooling passage.

14. The gas turbine engine of claim 13, further comprising a rear member disposed between the rear plenum and a collector space, the rear member including at least one opening allowing flow from the rear plenum, through the rear member, and into the collector space.

15. The gas turbine engine of claim 12, further comprising a plurality of inlet flow control vanes disposed proximate an inlet of the scroll cooling passage, the plurality of inlet flow control vanes spaced apart and arranged in a circumferential direction about the longitudinal axis proximate the inlet of the scroll cooling passage;

wherein the plurality of inlet flow control vanes direct flow into the inlet of the scroll cooling passage.

* * * * *